United States Patent Office

3,689,322
Patented Sept. 5, 1972

---

3,689,322
STORAGE BATTERY
Hans-Georg Lindenberg, Hannover, and Rolf Seyberlich, Bordenau, Germany, assignors to Varta Aktiengesellschaft, Frankfurt am Main, Germany
Filed Apr. 30, 1970, Ser. No. 33,189
Claims priority, application Germany, May 17, 1969,
P 19 25 295.0
Int. Cl. H01m 5/00
U.S. Cl. 136—135 S 15 Claims

ABSTRACT OF THE DISCLOSURE

A terminal post in a storage battery of polygonal cross-section and has an exposed planar contact face. The post formed below the contact face with a circumferentially elongated groove which may be continuous or discontinuous. A clamp straddles the contact face and has portions which are received in the grooves so that the clamp is retained on the terminal post. A connecting cable is provided with a strip-shaped cable connector which is located between the clamp and the contact face and is clampingly retained in engagement with both.

BACKGROUND OF THE INVENTION

The present invention relates generally to a storage battery, and more particularly to an arrangement for electrically connecting a storage battery with a connecting cable.

Electrical storage batteries, particularly those used for automotive vehicles and the like, are conventionally provided with terminal posts consisting of lead. These terminal posts are connected with the connecting cables by means of annular clamping collars whose center passage is conically configurated and which are drawn together by means of screws or bolts. Because the terminal posts consist of lead, it is a frequent occurrence that on tightening or drawing together the connecting collars, the terminal post becomes deformed with the result that, when the collar is subsequently to be removed for disconnecting the cable from the storage battery, force must be used to remove the collar from the pole. This, however, frequently results in a loosening of the sealing material which seals the space through which the terminal post enters into the interior of the storage battery housing, thus increasing the danger that acid may escape and cause undesired corrosion.

Of course, the difficulty resulting from this construction has long been recognized and attempts have been made to overcome it. Thus, various plug-in types of connections have been proposed with special sockets being mounted in or on these storage battery housings. This, however, has additional disadvantages. Not only are these constructions substantially more expensive in the conventional type of connection, but they also are not sufficiently protected against corrosion. In addition, they require a relatively larger number of components than the conventional connection and these components are fairly complicated so that they make the battery more expensive. Finally, this type of connection usually increases the space requirements for the storage battery because larger overhead space is necessary due to the plug-in connection.

SUMMARY OF THE INVENTION

It is, accordingly, a general object of the present invention to overcome the aforementioned disadvantages.

More particularly, it is an object of the present invention to provide a storage battery in which the disadvantages of the prior-art constructions with reference to the connection between the terminal posts of the battery and the cable connector are avoided.

An additional object of the invention is to provide such a construction which does not require increased space availability.

A concomitant object of the invention is to provide such a construction which is inexpensive and which permits ready connection and disconnection of the cable connector.

In pursuance of the above objects, and others which will become apparent hereafter, the present invention resides in a storage battery which, briefly stated, comprises a terminal post of polygonal cross-section having a planar contact face and being formed below the same with a circumferentially elongated groove. Clamping means straddles the contact face and is in part received in the groove so as to be retained on the terminal post. A connecting cable is provided and a strip-shaped cable connector is provided on the cable and clampingly retained between and in electrically conductive releasable engagement with the contact face and the clamping means.

The cross-sectional configuration of the terminal post is advantageously rectangular and preferably quadratic.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
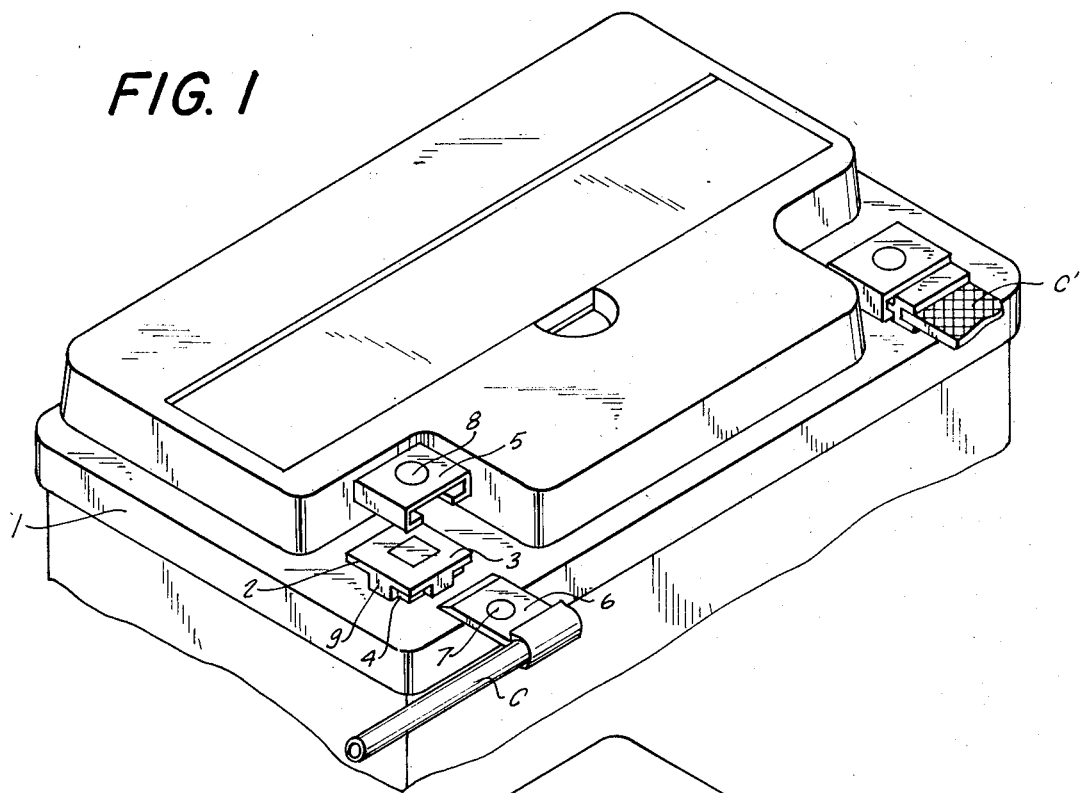
FIG. 1 is a fragmentary somewhat simplified perspective view illustrating a first embodiment of the invention.

Discussing now the drawing in detail, and firstly FIG. 1 thereof, it will be seen that reference numeral 1 identifies a storage battery per se. No details concerning the construction and configuration of the storage battery are required or will be given, because such storage batteries are well known to those skilled in the art and none of this information is in any way part of the present invention.

However, in accordance with the present invention, the storage battery 1 is provided with two terminal posts 2 which in the illustrated embodiment are of rectangular cross-sectional configuration. These terminal posts 2 have planar contact faces 3 which are also of rectangular configuration. Downwardly below the contact faces 3, each of the terminal posts 2 is provided with a groove, recess or depression 4 which is elongated in circumferential direction of the respective terminal post 2. It will be seen in FIG. 1 that two terminal posts have been illustrated, as is conventional, but that the invention has been explained with reference to only one of them, this being sufficient for an understanding of the invention, and it being understood that the details explained are applicable also to the other terminal post and to the associated components.

A clamp 5 is provided which straddles the contact face 3 and, being of substantially C-shaped configuration as illustrated, has portions or parts which are receivable in the groove 4—which in the illustrated embodiment has several portions or sections—simply by sliding the clamp 5 onto the terminal post 2 from one or the opposite side thereof. Projections 9, recesses or similar means, may be provided for preventing displacement of the clamp 5 with respect to the terminal post 2 when the clamp 5 is received in part in the groove 4.

The connecting cable which connects the storage battery 1 with the device to be supplied with electrical energy, is identified with reference character C. It is provided with a generally strip-shaped cable connector 6 of known construction which is interposed between the clamp 5 and the contact face 3. It is pressed against the latter by the clamp 5 in electrically conductive relationship. In order to improve the electrical contact, and also to prevent undesired withdrawal of the cable connector 6 from between the contact face 3 and the clamp 5, cooperating engaging portions may be provided. Thus, FIG. 1 shows that one of the engaging faces of the cable connector is provided with projection 7 and the abutment face of the clamp 5 which faces the contact face 3 is provided with a depression 8 (visible in FIG. 1 as a dome-shaped projection whose invisible underside is hollow and receives the projection 7). Of course, the relationship can be reversed, and it is also possible to provide similar means on the contact face 3 and the engaging face of the connector 6 which cooperates with the contact face 3. Furthermore, it is possible to make the clamp 5 fast with the cable connector 6 in suitable manner to avoid loss.

The second terminal post shown in FIG. 1 is illustrated as having a cable C' connected thereto by means of the just-described connecting arrangement.

Figure 2:
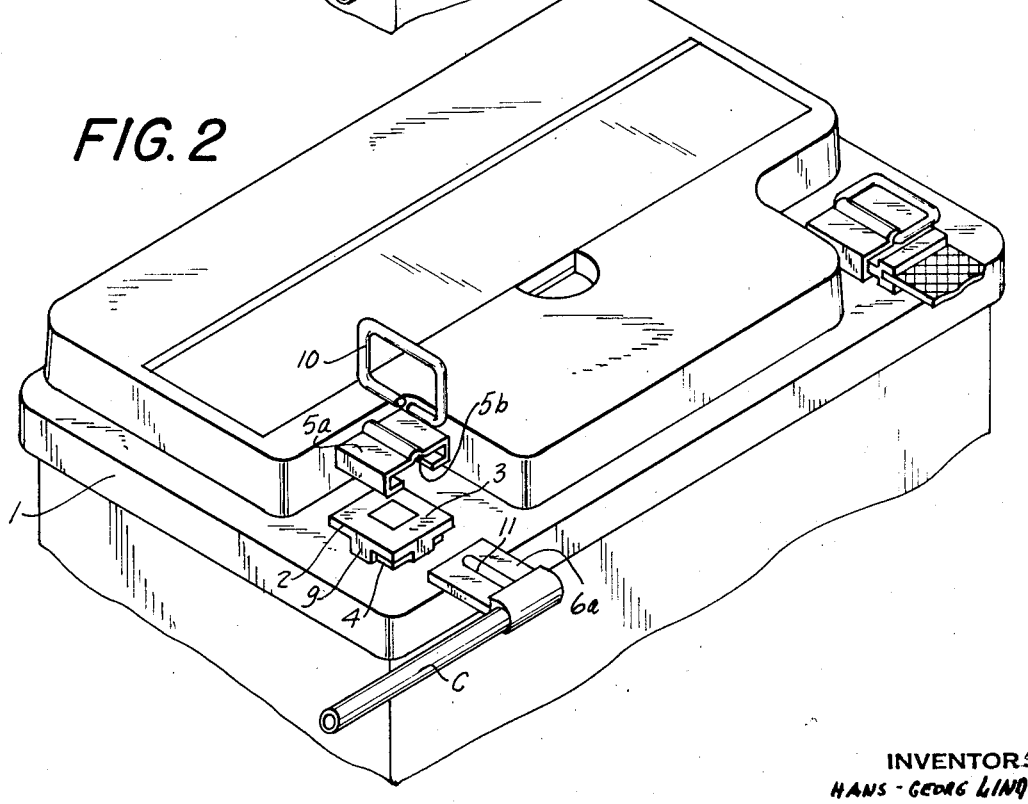
FIG. 2 is a view similar to FIG. 1 but illustrating a second embodiment of the invention.

Coming to FIG. 2 it will be seen that the embodiment illustrated therein differs somewhat from that of FIG. 1. In FIG. 2 like reference numerals identify like components as in FIG. 1. However, the terminal post 2 here cooperates with a somewhat differently configurated clamp 5a provided with an elongated recess or depression 5b on its underside which normally faces the contact face 3 of the terminal posts 2. The electrical strip-shaped cable connector is identified with reference numeral 6a and provided with an elongated depression 11 as shown. There is provided in addition a frame-shaped clamping member 10 for instance of wire or like material and having an oval cross-section. The member 10 is circumferentially incomplete and its opposite free ends are received from opposite sides in the depression 5b, as this is illustrated with reference to the established connection shown at the second terminal post in FIG. 2. These opposite free end portions thus are partially received in the depression 5b and, when the member 10 is in the illustrated position associated with the left-hand terminal post in FIG. 2, the minor axis of the oval cross-section of the member 10 will be normal to the plane of the contact face 3. When, however, the member 10 is displaced to assume the position illustrated with reference to the right-hand terminal post in FIG. 2, the major axis of the oval cross-section will extend normal to the plane of the contact face 3, so that a clamping action is exerted upon the cable connector 6a, firmly clamping the same between the contact face 3 and the clamp 5a. Of course, in this case as in the embodiment of FIG. 1, the clamp 5a together with its clamping member 10, may be secured to the cable connector 6a to prevent loss, and in this case as in the embodiment of FIG. 1, it is also possible to connect the clamp 5 or 5a with the clamping member 10 to the housing of the storage battery if this is preferred, again to avoid loss.

It is preferred, but not necessary, that the cross-sectional configuration of the terminal post 2 and the contact faces 3 be quadratic. With such a construction, it is particularly simple to secure the respective cable connector to the terminal post from two mutually opposite directions, whichever is preferred or whichever is dictated by given circumstances. Additionally, it is advantageous to make the area of the contact face 3 on one of the terminal posts 2 larger than the area of the contact face 3 on the other terminal post to prevent inadvertent reversal of the connection between the positive and negative terminals.

Various different materials are suitable for the present construction. Thus, leaded brass may be used for the terminal posts and the contact face 3. Similarly, the cable connectors 6 or 6a may also consist of the same material. The clamps 5, 5a may consist of stainless steel or another preferred springy material which is leaded or provided with a corrosion-resistant or preventive coating.

It is a particular advantage of the present invention that the mounting of the terminal posts of the cross-section disclosed herein on the respective storage batteries requires only very small amounts of heat energy for connection to the terminal bridges. This reduces significantly the danger that the sealing effect at the passage of the terminal post through the housing of the storage battery 1 might be damaged. By contrast, the conically configurated terminal posts of lead which conventionally are used, require substantial heat energy for a connection and frequently this results in a damage of the sealing effect.

An additional advantage of the construction according to the present invention is that it requires no increased height and that, furthermore, it is readily possible to locate the terminal posts not only on the top of the storage battery, but also at the sides if this is desired or dictated by space requirements.

It will be understood that each of the elements described above, or two or more together, may also find a useful application in other types of constructions differing from the types described above.

While the invention has been illustrated and described as embodied in a storage battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of the equivalence of the following claims.

What is claimed as new and desired to be protected by Letters Patent is set forth in the appended claims:

1. In a storage battery, in combination, a terminal post of polygonal cross-section having a planar contact face and being formed below the same with a circumferentially elongated groove; clamping means straddling said contact face and being in part received in said groove so as to be retained on said terminal post; a connecting cable; and a strip-shaped cable connector provided on said cable and clampingly retained between and in electrically conductive releasable engagement with said contact face and said clamping means.

2. In a storage battery as defined in claim 1, said clamping means having an abutment face and said connector having a pair of engagement faces which respectively cooperate with said contact face and said abutment face; and further comprising at least one recess and at least one mating projection each provided in two cooperating ones of said faces.

3. In a storage battery as defined in claim 2, wherein said two cooperating faces are said contact face and one of said engagement faces.

4. In a storage battery as defined in claim 2, wherein said two cooperating faces are said abutment face and one of said engagement faces.

5. In a storage battery as defined in claim 2; and at least one additional recess and at least one mating additional projection each provided in two other cooperating faces.

6. In a storage battery as defined in claim 1, said clamping means comprising a clamping member having a first part straddling said contact face and a second part received in said groove.

7. In a storage battery as defined in claime 6, said groove being bounded by a surface; and further provided cooperating engaging portions on said surface and said second part, respectively, for preventing undesired movement of said second part in said groove.

8. In a storage battery as defined in claim 1, said clamping means comprising a part straddling said contact face and having an underside facing said contact face and provided with an elongated depression, and a frame-shaped clamping member of oval cross-section in part received in said depression and engaging said cable connector for pressing the same clampingly against said contact face in response to displacement of said clamping member to a position in which the major axis of said oval cross-section is substantially normal to the plane of said contact face.

9. In a storage battery as defined in claim 1, said clamping means comprising a part straddling said contact face, and eccentric means cooperating with said part and operative for clampingly pressing said cable connector against said contact face.

10. In a storage battery as defined in claim 1, wherein said contact face and the cross-section of said terminal post are rectangular.

11. In a storage battery as defined in claim 1, wherein said contact face and the cross-section of said terminal post are quadratic.

12. In a storage battery as defined in claim 11; further comprising an additional terminal post similar to the first-mentioned one, additional clamping means, an additional cable and an additional cable connector all cooperating with said additional terminal post; and wherein the area of the contact face on said additional terminal post is different from the area of the contact face on the first-mentioned terminal post.

13. In a storage battery as defined in claim 1, said terminal post and said cable connector consisting of leaded brass.

14. In a storage battery as defined in claim 1, wherein said clamping means consists at least predominantly of stainless steel.

15. In a storage battery as defined in claim 1, wherein said clamping means consists of a springy material and an anti-corrosion coating provided on the same.

References Cited

UNITED STATES PATENTS

| | | | |
|---|---|---|---|
| 2,109,424 | 2/1938 | Hess | 136—135 S |
| 1,844,916 | 2/1932 | Dykes | 136—135 S |
| 2,541,617 | 2/1951 | Scott | 339—240 |
| 2,945,207 | 7/1960 | Duks | 339—276 F |
| 3,493,919 | 2/1970 | Koltkamp | 339—258 S |

DONALD L. WALTON, Primary Examiner

U.S. Cl. X.R.

339—258 S, 228, 276 F